(12) United States Patent
Chien et al.

(10) Patent No.: US 11,280,473 B2
(45) Date of Patent: Mar. 22, 2022

(54) OPTICAL LENS, LIGHT-EMITTING DEVICE AND BACKLIGHT MODULE

(71) Applicant: AU OPTRONICS CORPORATION, Hsin-Chu (TW)

(72) Inventors: Chih-Wei Chien, Hsin-Chu (TW); Li-Wei Tseng, Hsin-Chu (TW); Shau-Yu Tsai, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/944,391

(22) Filed: Jul. 31, 2020

(65) Prior Publication Data

US 2021/0041082 A1 Feb. 11, 2021

(30) Foreign Application Priority Data

Aug. 7, 2019 (TW) .................................. 108128072

(51) Int. Cl.
| | |
|---|---|
| *F21V 5/04* | (2006.01) |
| *F21K 9/69* | (2016.01) |
| *G02B 3/06* | (2006.01) |
| *G06F 1/16* | (2006.01) |
| *F21Y 115/00* | (2016.01) |

(52) U.S. Cl.
CPC .............. *F21V 5/048* (2013.01); *F21K 9/69* (2016.08); *G02B 3/06* (2013.01); *G06F 1/1609* (2013.01); *F21Y 2115/00* (2016.08)

(58) Field of Classification Search
CPC combination set(s) only.
See application file for complete search history.

(56) References Cited

U.S. PATENT DOCUMENTS

| | | | |
|---|---|---|---|
| 9,212,804 B2 | 12/2015 | Zhang et al. | |
| 9,482,854 B2 | 11/2016 | Kim et al. | |
| 10,203,086 B2 | 2/2019 | Kang | |
| 2019/0162389 A1* | 5/2019 | Shah .................. | G02B 19/0052 |

FOREIGN PATENT DOCUMENTS

| | | |
|---|---|---|
| CN | 103090309 A | 5/2013 |
| CN | 103868021 | 6/2014 |
| CN | 203784829 U | 8/2014 |
| CN | 105423235 A | 3/2016 |
| CN | 106200117 A | 12/2016 |
| CN | 107085252 A | 8/2017 |
| CN | 107966856 A | 4/2018 |
| CN | 105318275 B | 3/2019 |
| TW | 201743082 | 12/2017 |

OTHER PUBLICATIONS

CNIPA has issued the Office Action for the corresponding China application dated Aug. 20, 2021.
The CNIPA has issued the Office Action for the corresponding China application dated Dec. 8, 2021.

* cited by examiner

*Primary Examiner* — Anne M Hines
(74) *Attorney, Agent, or Firm* — WPAT, PC

(57) ABSTRACT

An optical lens, a light-emitting device and a backlight module are provided. The optical lens is used for adjusting light emitted from a light-emitting unit. The optical lens includes a light-incident surface and a light-emitting surface. The light-incident surface encloses a space for accommodating the light-emitting unit. The light-emitting surface is used for receiving and emitting light entering the optical lens via the light-incident surface. The optical lens has an optical axis, with respect to which the light-incident surface is asymmetric.

15 Claims, 7 Drawing Sheets

OPTICAL LENS, LIGHT-EMITTING DEVICE AND BACKLIGHT MODULE

BACKGROUND

Technical Field

The present invention relates to an optical lens, a light-emitting device, and a backlight module, in particular to an optical lens, a light-emitting device and a backlight module for adjusting the light distribution.

Related Art

Conventionally, the optical lens used for the light-emitting unit (e.g. the light-emitting diode) is generally Z-axis symmetry, that is, symmetrical with respect to the light-emitting direction of the light-emitting unit. However, on the premise of the directional distribution of light-emitting units, this kind of optical lens with the symmetrical design is easy to cause light superposition in a specific direction, resulting in the problem of over light or insufficient light output in other direction. For example, with the development of display technology, the design of the backlight module tends to reduce the number of light-emitting units to reduce costs and improve assembly efficiency. Therefore, the arrangement of light-emitting units is usually distributed along a specific direction, so the above-mentioned uneven distribution of light occurs.

SUMMARY

Therefore, the present invention proposes an optical lens, a light-emitting device, and a backlight module which make the light-incident surface of the optical lens is asymmetric with respect to the optical axis, so as to reduce the problem of excessively bright light in a specific direction and insufficient light in a specific direction.

An embodiment of the present invention provides an optical lens for adjusting light emitted by a light-emitting unit, including a light-incident surface and a light-emitting surface. The light-incident surface encloses a space for accommodating the light-emitting unit. The light-emitting surface receives and emits the light entering the optical lens from the light-incident surface. Further, the light entering the optical lens from the light-incident surface arrive the light-emitting surface and at least partially pass through the light-emitting surface. The optical lens has an optical axis, and the light entering surface is asymmetric with respect to the optical axis.

Another embodiment of the present invention provides a light-emitting device, which comprises a light-emitting unit and the above optical lens. The light-emitting unit is arranged in the space enclosed by the light-incident surface.

Another embodiment of the present invention provides a backlight module, which comprises a plurality of the above-mentioned light-emitting devices. The light-emitting devices are arranged along the perpendicular to the short axis.

To further understand the features and technical content of the present invention, please refer to the following detailed description and diagrams of the present invention. However, the diagrams provided are for reference and explanation only and are not intended to limit the present invention.

DETAILED DESCRIPTION

Figure 1A:
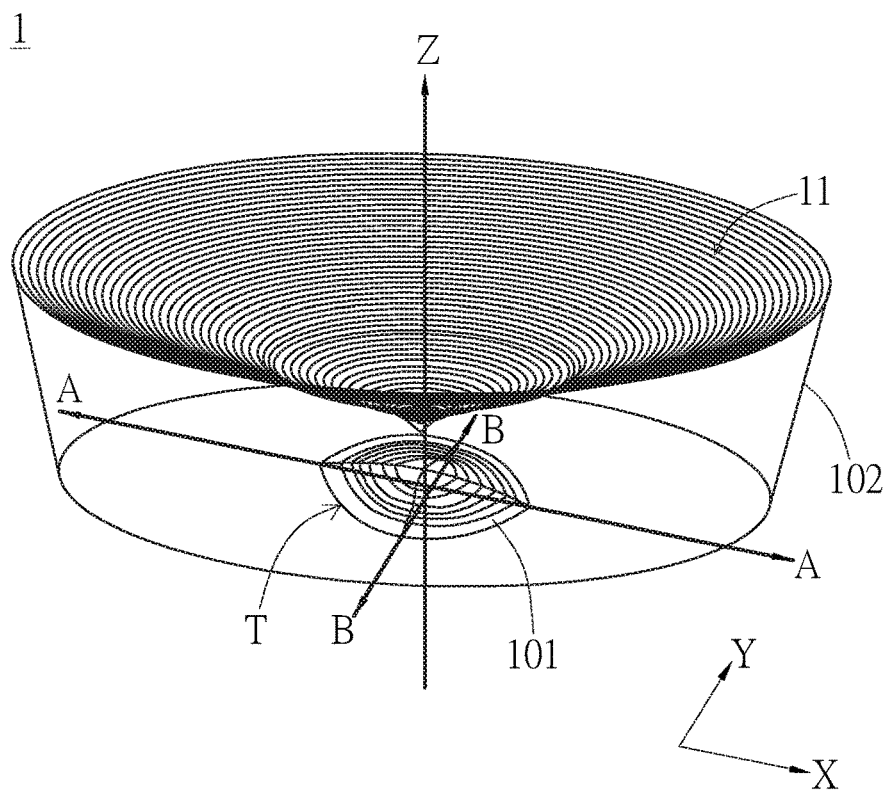
FIG. 1A shows a stereoscopic schematic of an optical lens according to the first embodiment of the present invention.

The following describes the implementation of the optical lens, light-emitting device, and backlight module disclosed by the present invention through specific embodiments and FIGS. 1A to 7B. Those skilled in the art can understand the advantages and effects of the present invention from the content disclosed in this specification. However, the content disclosed below is not intended to limit the protection scope of the present invention. Without departing from the spirit of the inventive concept, those skilled in the art can implement the present invention in other different embodiments based on different viewpoints and applications.

In the attached figures, for the sake of clarity, all shown are simplified schematic diagrams to illustrate the basic structure of the present invention. Therefore, the structure shown in the attached figures is not drawn according to the actual shape and size ratio. For example, for the convenience of explanation, the size of a specific element is enlarged. In addition, it should be understood that when an element such as a layer, film, region, or substrate is referred to as being "on" or "connected to" another element, it can be directly on or connected to the other element, or intermediate elements may also be present. In contrast, when an element is referred to as being "directly on" or "directly connected to" another element, there are no intermediate elements present. As used herein, "connected" may refer to physical and/or electrical connections. Furthermore, "electrical connection" or "coupling" can be the presence of other elements between the two elements.

Unless otherwise defined, all terms (including technical and scientific terms) used herein have the same meaning as generally understood by those of ordinary skill in the art to which the present invention belongs. It will be further understood that terms such as those defined in commonly used dictionaries should be interpreted as having meanings consistent with their meanings in the context of the relevant technology and the present invention, and will not be interpreted as idealized or overly formal meaning unless clearly defined in this article.

The optical lens 1, the light-emitting device U, and the backlight module B of the first embodiment of the present invention will be described below in coordination with reference to FIGS. 1A to 6. First, referring to FIG. 1A, the optical lens 1 has a light-incident surface 101 and a light-emitting surface 102. The light-incident surface 101 encloses a space S for accommodating a light-emitting unit 2. The light-emitting surface 102 is used to receive the light entering into the optical lens 1 from the light-incident surface 101 and emit the light to the outside of the optical lens 1. Please refer to FIGS. 1A and 1B. In this embodiment, the optical lens 1 has an optical axis Z, and the light-incident surface 101 of the optical lens 1 is asymmetric with respect to the optical axis Z. Specifically, the optical axis Z is an imaginary line, which in this embodiment refers to the distribution center of the light emitted by the optical lens 1. The above-mentioned "the light-incident surface 101 is asymmetric with respect to the optical axis Z" means that the light-incident surface 101 is not completely symmetrical with respect to the optical axis Z. Specifically, when the light-incident surface 101 is not completely symmetrical with respect to the optical axis Z, it means that the light-incident surface 101 has a large light-receiving surface in a certain direction perpendicular to the optical axis Z. In this embodiment, through the technical means that the light-incident surface 101 is asymmetric with respect to the optical axis Z, the light-emitting device U can adjust the light distribution of the light-emitting unit 2.

Figure 2A:
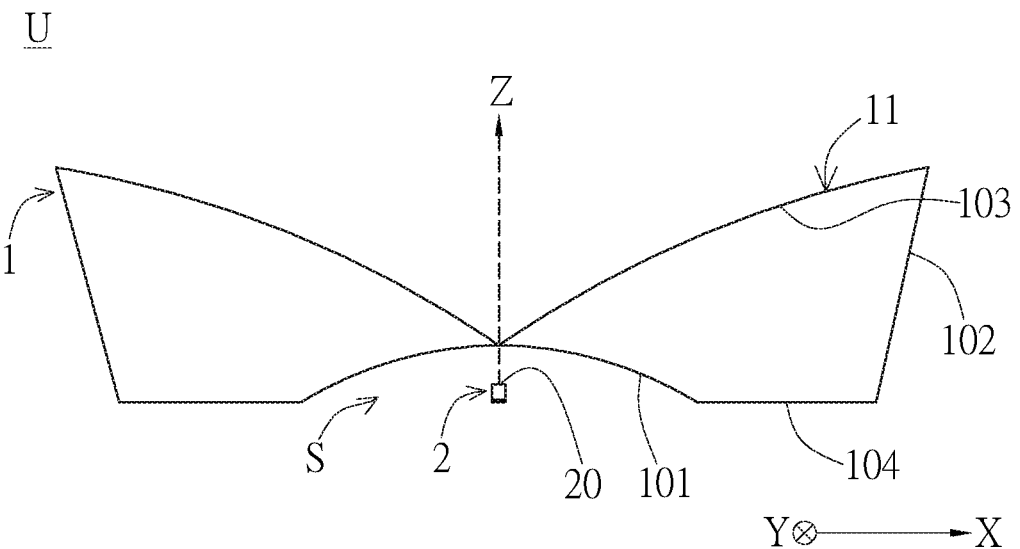
FIG. 2A shows a side view of the display device according to the first embodiment of the present invention.

FIG. 2A shows a light-emitting device U provided by the present invention, which includes an optical lens 1 and a light-emitting unit 2 as shown in FIG. 1A, wherein the light-emitting unit 2 is arranged in space S. In this embodiment, the light-emitting unit 2 is, for example, a light-emitting diode, and the optical lens 1 can be made by injection molding of a transparent material (e.g. acrylic), however, the present invention is not limited to this.

Figure 1B:
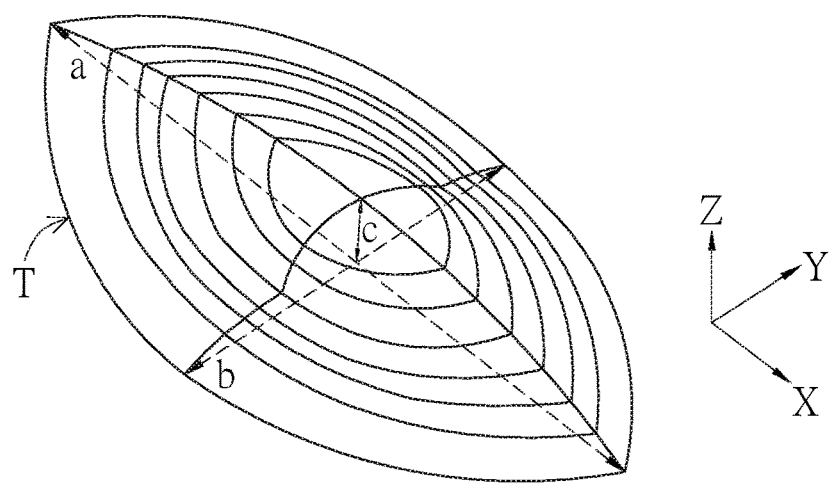
FIG. 1B shows a stereoscopic schematic of the light-incident surface of the optical lens according to the first embodiment of the present invention.

Further, in this embodiment, the vertical projection of the light-incident surface 101 in the optical axis Z direction has a long axis and a short axis with different lengths. Referring to FIG. 1B, in this embodiment, the long axis a extends along the long axis direction X, the short axis b extends along the short axis direction Y, and the long axis a is defined as the maximum width of the vertical projection of the light-incident surface 101 in the optical axis Z direction (that is, the area surrounded by the edge trajectory T of the light-incident surface 101) through the center; The short axis b is defined as the maximum width passing through the vertical projection center and perpendicular to the long axis. In this embodiment, the long axis a and the short axis b have different lengths. In other words, on a plane perpendicular to the optical axis Z, each point on the vertical projection profile of the light-incident surface 101 is not equidistant from the vertical projection center. Thereby, the light-incident surface 101 will receive more light in at least one direction perpendicular to the optical axis Z than other directions perpendicular to the optical axis Z. Therefore, the light-emitting device U of the embodiment of the present invention can solve the problem that the light output in a specific direction is too high or too low.

Figure 2B:
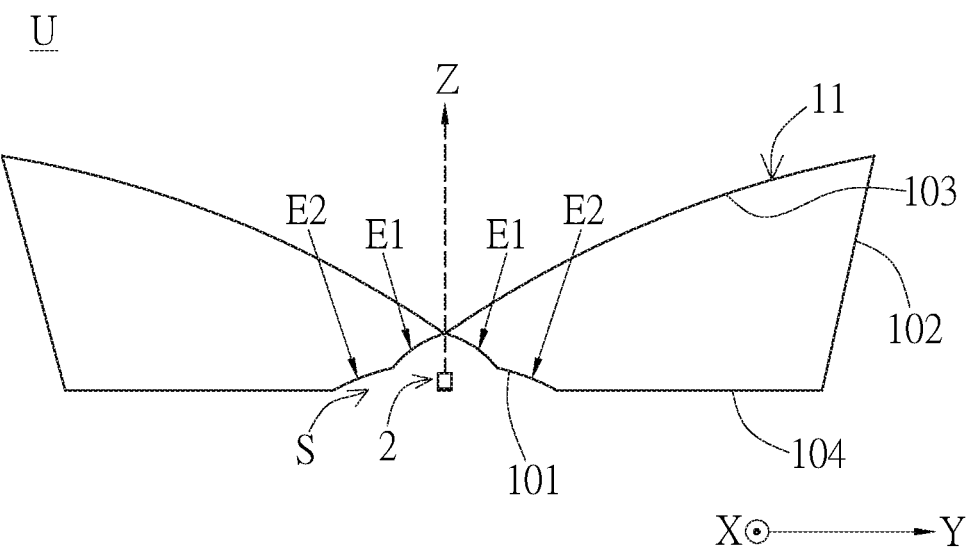
FIG. 2B shows a side view of another direction of the display device according to the first embodiment of the present invention.

FIG. 2A shows a cross-section of the optical lens 1 of FIG. 1A along the section line AA in cooperation with the arrangement of the light-emitting unit 2, wherein the section line AA overlaps the long axis a; FIG. 2B is a cross-sectional of the optical lens 1 of FIG. 1A along the sectional line BB in cooperation with the arrangement of the light-emitting unit 2, wherein the cross-sectional line BB overlaps with the short axis b. Comparing FIG. 2A and FIG. 2B, it can be seen that since the length of the long axis a is longer than the length of the axis b, the light-incident surface 101 along the direction of the long axis a will have more area to receive incident light from the light-emitting unit 2, and the incident light will be directed toward the short axis Y or near the short axis direction Y incident the optical lens 1, and along the short axis b direction there will be a relatively small area to receive light from the light-emitting unit 2, so there is relatively little incident light directed toward the long axis direction X or near the long axis direction X incident optical lens 1. Therefore, the light-emitting device U of the embodiment of the present invention can increase the ratio of the light output in the short-axis direction Y to the light output in the long-axis direction X.

In addition, as shown in FIGS. 1A, 2A, and 2B, in this embodiment, the optical lens 1 further has a concave part 11 that concaves the optical lens 1 on the side of the optical lens 1 away from the light-incident surface 101, and the concave part 11 has a reflecting surface 103 on the side of facing the light-incident surface 101. The reflecting surface 103 is used to receive the light entering the optical lens 1 from the light-incident surface 101, and the light-emitting surface 102 respectively connects the edge of the reflecting surface 103 and the light-incident surface 101 to receive the light reflected from the reflecting surface 103 and emit the light out of the optical lens 1. Specifically, the light-emitting surface 102 may be connected to the light-incident surface 101 by a setting surface 104, as shown in FIG. 2A and FIG. 2B, where the setting surface 104 is the part used by the light-emitting unit 2 to contact the setting location (for example, a light source substrate). Alternatively, in other embodiments, the light-emitting surface 102 may be directly connected to the edge of the light-incident surface 101, that is, the edge of the light-emitting surface 102 and the edge of the light-incident surface 101 jointly serve as a support portion of the light-emitting unit 2. It should be noted that the present invention is not limited to the above. In other embodiments, the optical lens 1 may not include the concave part 11 and the reflecting surface 103. The light entering the light-incident surface 101 will be refracted directly from the light-emitting surface 102, and the relevant embodiments will be described below with reference to FIG. 7A and FIG. 7B.

Further, referring to FIG. 2B, the light-incident surface 101 of this embodiment has a first curved surface E1 and a second curved surface E2 each on both sides of the relative long axis direction X. The first curved surface E1 is connected to the second curved surface E2, and the first curved surface E1 and the second curved surface E2 are arranged along the optical axis Z. As shown in the figure, in this embodiment, the average slope of the first curved surface E1 is greater than the average slope of the second curved surface E2. The average slope mentioned above refers to the slope between the two ends of the optical axis Z direction corresponds to the first curved surface E1 and the second curved surface E2. With the above technical means, in this embodiment, the incident light received by the light-incident surface 101 can be concentrated toward the reflecting surface 103, thereby improving the efficiency of using the incident light. However, the present invention is not limited to this. In other embodiments, the light-incident surface 101 may also be formed by a curved surface with continuous curvature.

Figure 3A:
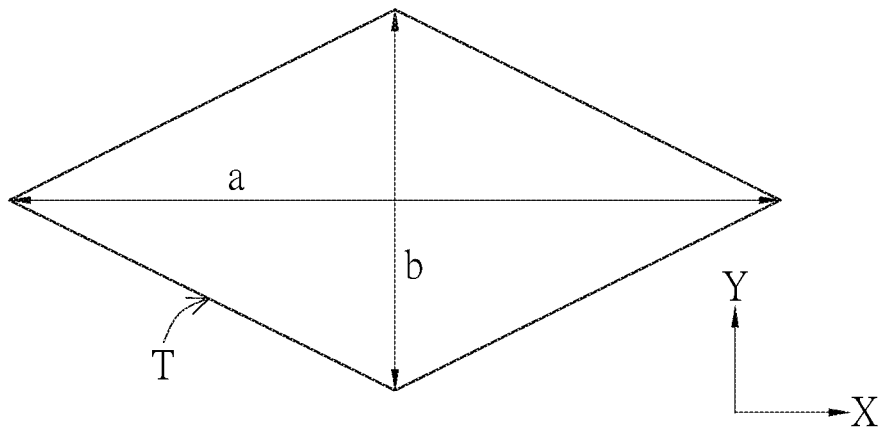
FIG. 3A shows a variation embodiment of the edge trajectory of the optical lens according to the first embodiment of the present invention.
Figure 3B:
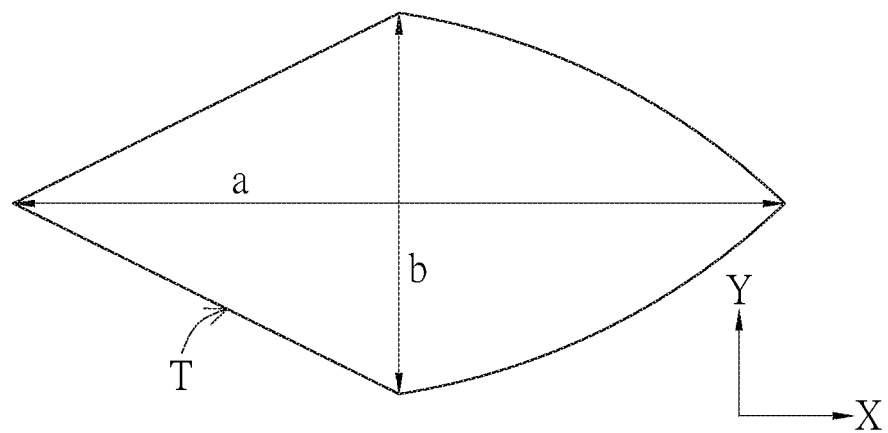
FIG. 3B shows another variation of embodiment of the edge trajectory of the optical lens according to the first embodiment of the present invention.

Please refer to FIGS. 1B, 3A, and 3B. In the embodiment of FIG. 1B, the edge trajectory T of the light-incident surface 101 is a curve close to an ellipse. However, the present invention is not limited to this. The edge trajectory T of the light-incident surface 101 may be a straight line or a curve, or a combination of both. For example, in the variant embodiment of FIG. 3A, the edge trajectory T is composed of line segments, while in the variant embodiment of FIG. 3B, the edge trajectory T is composed of a line segment and a curve. Those skilled in the art can design the edge trajectory T according to the actual requirements such as the light-emitting direction and the optical effect.

Figure 4:
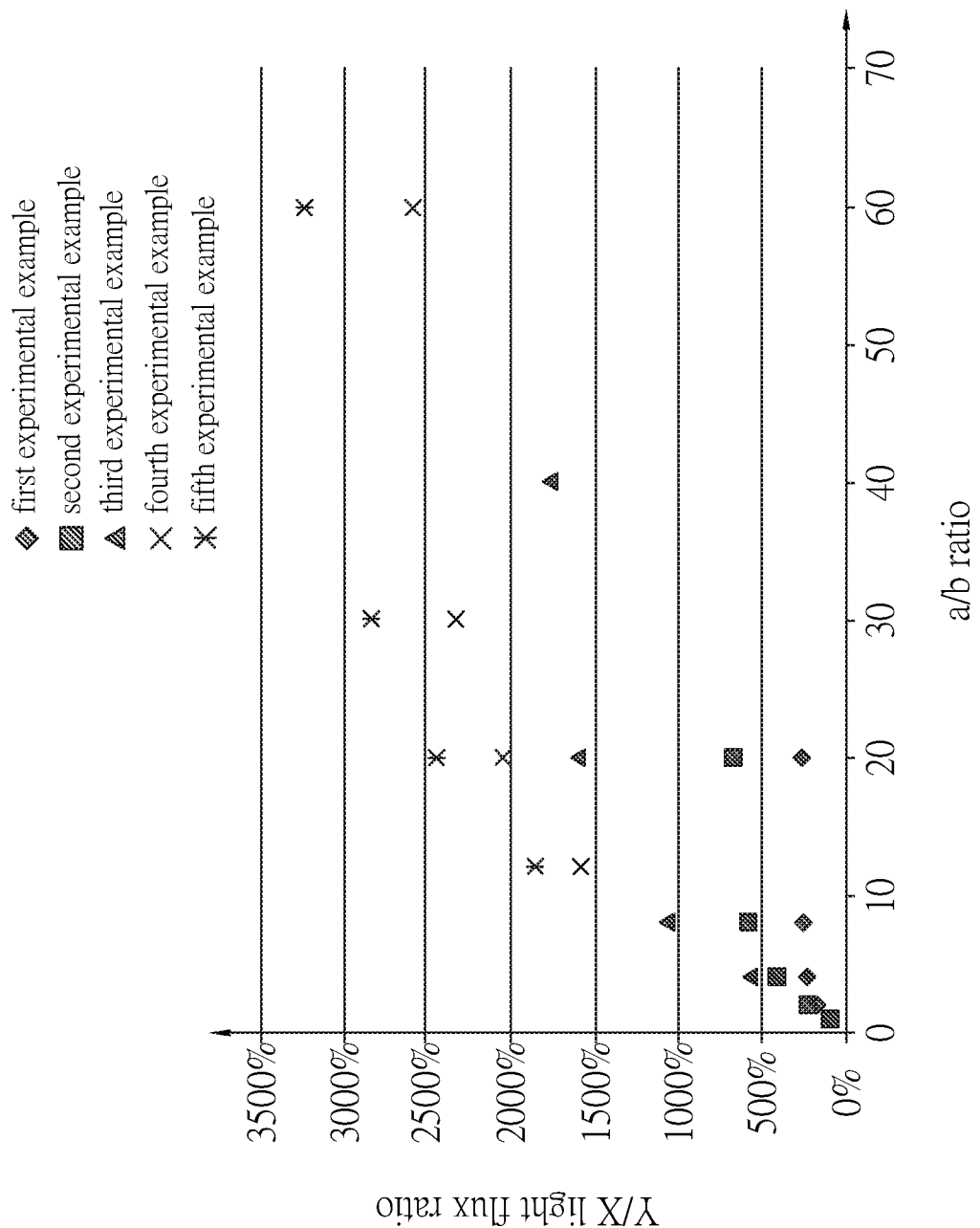
FIG. 4 shows the ratio of the light flux in the short axis direction to the long axis direction in the range of the ratio of the long axis to the short axis of the light-incident surface of the light-emitting device according to the first embodiment of the present invention.

In a preferred embodiment of the present invention, the ratio of the long axis a and the short axis b of the vertical projection of the light-incident surface 101 is between 200% and 6000%, and the ratio of the height of the light-incident surface 101 to the short axis b is between 100% and 1000%. For details, please refer to FIG. 1B, FIG. 2A and FIG. 4. FIG. 4 shows the ratio of the light flux in the short axis direction Y to the long axis direction X of the light-emitting device U of the first embodiment of the present invention within a ratio range of a long axis a to a short axis b of the light-incident surface 101. Wherein, the first experimental example is the optical lens 1 with a height c of 1.8 mm and a short axis b of 1.5 mm is matched with a light-emitting unit 2 with a size of 1.3 mm; the second experimental example is an optical lens 1 with a height c of 3.6 mm and a short axis b of 1.5 mm is matched with a light-emitting unit with a size of 1.3 mm; the third experimental example is an optical lens 1 with a height c of 7.2 mm and a short axis b of 1.5 mm is matched with a light-emitting unit with a size of 1.3 mm; the fourth experimental example is an optical lens 1 with a height c of 7.2 mm and a short axis b of 1.0 mm is matched with a light-emitting unit with a size of 1.3 mm; the fifth experimental example is an optical lens 1 with a height c of 7.2 mm and a short axis b of 1.0 mm is matched with a light-emitting unit with a size of 0.5 mm.

As shown in FIG. 4, the higher the ratio of the long axis a to the short axis b, the higher the light flux of the short axis direction Y relative to the long axis direction X. That is, under the same amount of incident light, the long axis A is relatively longer than the short axis B, the more incident light can be distributed to the short axis direction Y by the incident light surface 101. In the first experimental example and the second experimental example where the height c of the optical lens 1 is lower, the light distribution effect tends to be saturated when the ratio of the long axis a to the short axis b is around 20. In the third, fourth, and fifth experimental examples with higher heights, taking the fifth experimental with the smallest size of the light-emitting unit 2 example as an example, it has the highest light distribution effect. The above light distribution effect refers to the effect that the optical lens 1 emits incident light to the short axis direction Y at a high ratio, that is, the higher the horizontal axis value, the better the light distribution effect. Therefore, as can be seen from FIG. 4, when the ratio of the long axis a to the short axis b is between 200% and 6000%, and the ratio of the height of the light-incident surface 101 to the short axis b is between 100% and 1000%, it can be achieved better light distribution effect.

Figure 5:
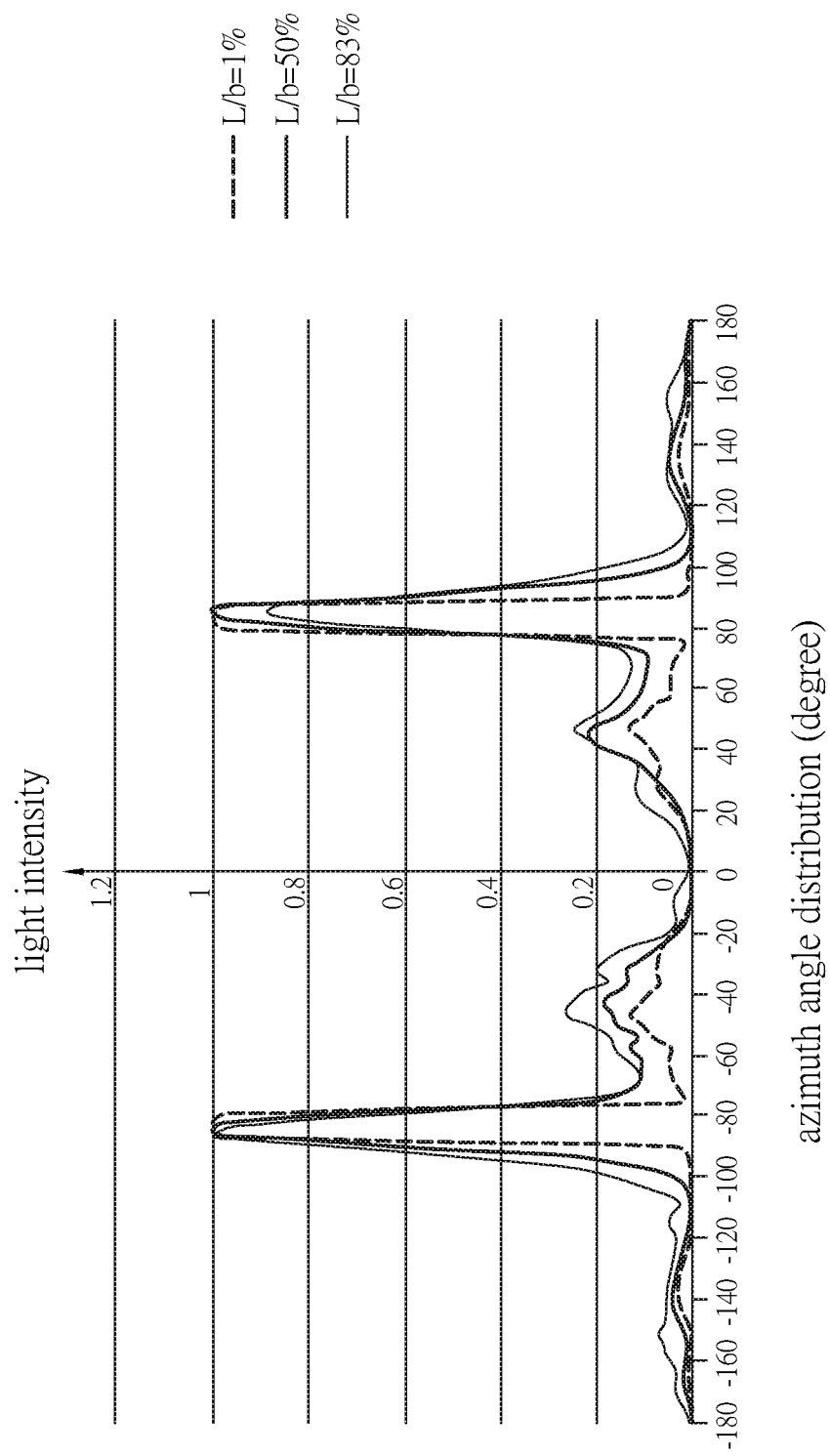
FIG. 5 shows the light intensity azimuthal distribution of the light-emitting device at the ratio of different light-emitting surface to short axis length according to the first embodiment of the present invention.

Please refer to FIG. 1B, FIG. 2A, and FIG. 5 together. The light-emitting unit 2 has a light-emitting surface 20, and in a preferred embodiment of the present invention, the ratio of the maximum length L of the light-emitting surface 20 to the short axis b is between 1% and 50%, and the maximum length of the light-emitting surface 20 is preferably between 0.02 mm and 5 mm. The above light-emitting surface 20 means an equivalent light-emitting surface 20, that is, a vertical projection range of the actual light-emitting surface of the light-emitting unit 2 in the optical axis Z direction. The maximum length L refers to the maximum length that the light-emitting surface 20 can measure. For example, when the light-emitting unit 2 is a square LED chip, the maximum length refers to the diagonal width of the LED chip; when the light-emitting unit 2 is circular, the maximum length refers to the diameter of the light-emitting unit 2. In FIG. 5, the azimuth of 0 degrees corresponds to the long axis direction X, and the azimuth of 90 degrees corresponds to the short axis direction Y. in the figure, the light intensity emitted in different azimuth angles in three experiments where the ratio of the maximum length L to the short axis B respectively is 1%, 50%, and 83% is taken as an example. It can be seen from FIG. 5 that when the ratio of the maximum length L of the light-emitting surface 20 to the short axis b is between 1% and 50% (please refer to the two experimental examples in which the dotted line and the thick line are respectively represented in the figure, and the ratio of L/B is 1% and 50%, respectively), the light-emitting device U has a lower light leakage phenomenon, that is, the ratio of light emitted toward an angle other than 90 degrees is smaller, and thus has a better light distribution effect. In contrast, when the maximum length L of the light-emitting surface 20 is closer to the length of the short axis b (see the experimental example shown by the thin line in the figure and the L/b ratio is 83%), the higher the light leakage ratio is, the worse the light distribution effect is. In addition, the light-emitting unit 2 of this embodiment is a rectangular light-emitting diode, and its light-emitting surface 20 is a flat surface, however, the present invention is not limited thereto. In other embodiments, the light-emitting diode may also be, for example, circular and the light-emitting surface is not limited to a flat surface.

Figure 6:
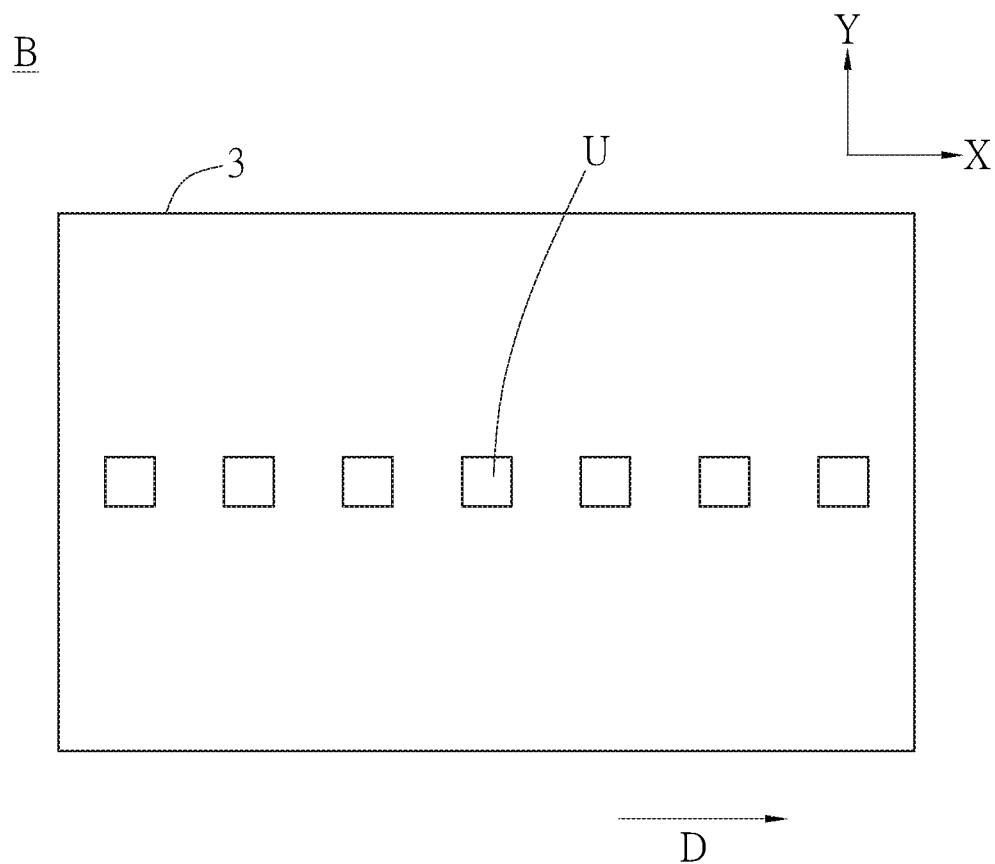
FIG. 6 shows a schematic diagram of a backlight module according to the first embodiment of the present invention.

FIG. 6 shows the backlight module B provided in this embodiment, which has a plurality of light-emitting devices U disposed on the light source substrate 3 and the light-emitting devices U are arranged along the direction D. As shown in the figure, in this embodiment, the direction D is perpendicular to the short axis direction Y and parallel to the long axis direction X. Therefore, when combined with the light-emitting device U provided in this embodiment since it can provide a higher light flux in the short axis direction Y compared with the long axis direction X, the problem that the light flux in the direction D is too high and the light flux in the direction perpendicular to the direction D is too low caused by the arrangement of the familiar light-emitting devices in the direction D is solved. Thus, the optical lens 1, the light-emitting device U and the backlight module B provided by the present invention can adjust the amount of light emitted in a specific direction to solve the problem of excessively high or low light flux caused by the arrangement of the light-emitting devices U.

Figure 7A:
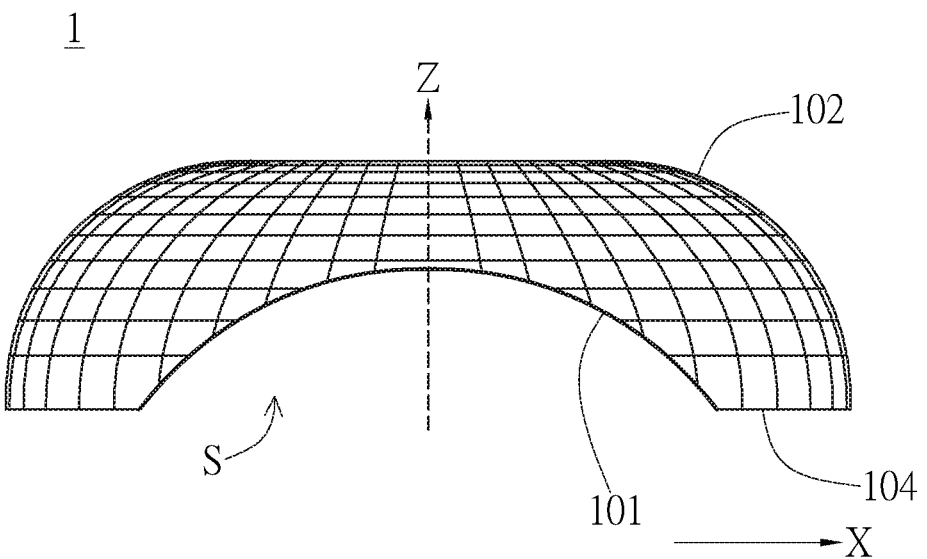
FIG. 7A shows a side view of an optical lens according to a second embodiment of the present invention.
Figure 7B:
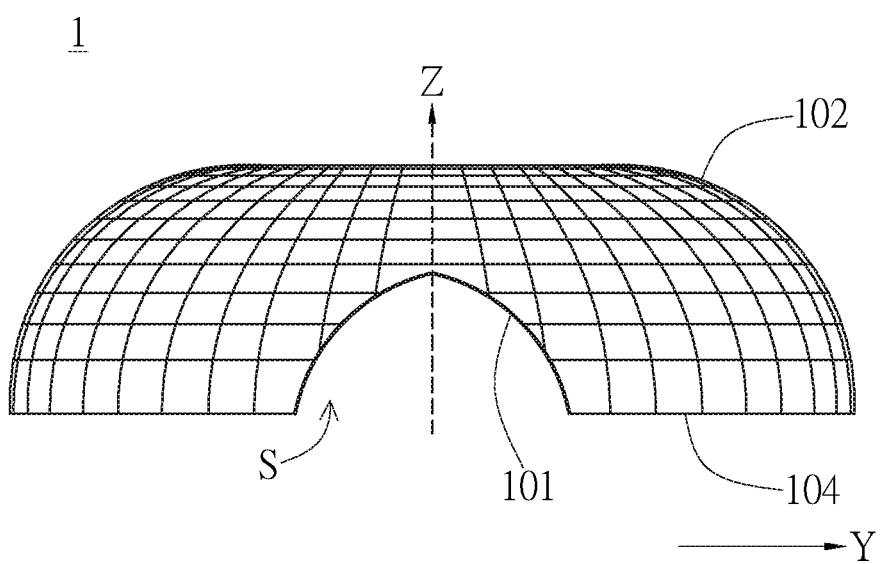
FIG. 7B shows a side view of another direction of the optical lens according to the second embodiment of the present invention.

FIG. 7A and FIG. 7B show side views of the optical lens 1 according to the second embodiment of the present invention at different angles. Compared with the first embodiment, the main difference between the second embodiment and the first embodiment of the present invention lies in the light-emitting path of light incident from the light-incident surface 101. In detail, shown on comparing with FIG. 7A and FIG. 1A, the second embodiment does not have the concave part 11 of the first embodiment. The light-emitting surface 102 of the second embodiment is a convex surface opposite to the light-incident surface 101 to receive the light incident from the optical surface 101 to the optical lens 1. In addition, in the first embodiment, the light-incident surface 101 has a first curved surface E1 and a second curved surface E2; in this embodiment, the light-incident surface 101 is composed of curved surfaces with continuous curvature. The other main technical features of this embodiment are substantially the same as those of the first embodiment, and will not be repeated here. Comparing FIGS. 7A and 7B, it can be seen that the present embodiment also has a long axis a that is longer than a short axis b, so that the incident light is distributed toward the short axis direction Y at a large ratio.

In summary, the optical lens 1, the light-emitting device U and the backlight module provided by the embodiment of the present invention adopt the technical means of "optical lens has an optical axis, and the incident surface is not completely symmetrical with respect to the optical axis" to improve the ratio of the light-emitting in the short axis direction Y to the long axis direction X.

The contents disclosed above are only the preferred and feasible embodiments of the invention, not limiting the scope of the patent application of the invention. Therefore, all equivalent technical changes made by using the description and schematic contents of the invention fall within the scope of the patent application of the invention.

What is claimed is:

1. An optical lens for adjusting the light emitted by a light emitting unit, comprising:
    a light-incident surface configured to enclose a space for accommodating the light-emitting unit; and
    a light-emitting surface, wherein the light entering the optical lens from the light-incident surface arrives at the light-emitting surface and at least partially pass through the light-emitting surface;
    wherein, the optical lens has an optical axis, and the light-incident surface is not completely symmetrical with respect to the optical axis;
    wherein the light-incident surface has a first curved surface and a second curved surface arranged along the optical axis, wherein the first curved surface and the second curved surface have different average slopes.

2. The optical lens according to claim 1, wherein the vertical projection of the light-incident surface in the optical axis direction has a long axis and a short axis with different lengths.

3. The optical lens according to claim 2, wherein the ratio of the long axis to the short axis is between 200% and 6000%.

4. The optical lens according to claim 2, wherein the ratio of a height of the light-incident surface to the short axis is between 100% and 1000%.

5. The optical lens according to claim 2, wherein the first curved surface and the second curved surface are each on opposite sides corresponding to the long axis, the first curved surface is connected to the second curved surface.

6. The optical lens according to claim 5, wherein the average slope of the first curved surface is greater than the average slope of the second curved surface.

7. The optical lens according to claim 1, wherein an edge trajectory of the light-incident surface is a combination of at least one of a straight line and a curved line.

8. The optical lens according to claim 1, wherein the light-emitting surface is a convex surface facing away from the light-incident surface and opposite to the light-incident surface.

9. The optical lens according to claim 1, further comprising:
    a concave part concaved into the optical lens on a side of the optical lens opposite to the light-incident surface, the concave part has a reflective surface on the side facing the light-incident surface, wherein the light emitting surface respectively connects the edge of the reflective surface and the incident surface.

10. A light-emitting device, comprising a light-emitting unit and the optical lens according to claim 1, wherein the light-emitting unit is disposed in the space.

11. The light-emitting device according to claim 10, wherein the light-emitting unit has a light-emitting surface, and a ratio of a maximum length of the light-emitting surface to the short axis is between 1% and 50%.

12. The light-emitting device according to claim 10, wherein the light-emitting unit has a light-emitting surface, and a maximum length of the light-emitting surfaces is between 0.02 mm and 5 mm.

13. A backlight module, comprising: a plurality of light-emitting devices according to claim 10, wherein the light-emitting devices are arranged in a direction perpendicular to the short axis.

14. The backlight module according to claim 13, wherein the light-emitting unit has a light-emitting surface, and a ratio of a maximum length of the light-emitting surface to the short axis is between 1% and 50%.

15. The backlight module according to claim 13, wherein the light-emitting unit has a light-emitting surface, and a maximum length of the light-emitting surfaces is between 0.02 mm and 5 mm.

* * * * *